United States Patent [19]

Buzzi

[11] 4,407,890
[45] Oct. 4, 1983

[54] RUBBER ARTICLES, PARTICULARLY MOULDED RUBBER ARTICLES FOR USE IN SANITARY FITTINGS

[75] Inventor: Günter Buzzi, Schiltach, Fed. Rep. of Germany

[73] Assignee: Hans Grohe GmbH & Co. KG, Fed. Rep. of Germany

[21] Appl. No.: 280,707

[22] Filed: Jul. 6, 1981

Related U.S. Application Data

[63] Continuation of Ser. No. 102,503, Dec. 11, 1979, abandoned.

[30] Foreign Application Priority Data

Dec. 16, 1978 [DE]  Fed. Rep. of Germany ....... 2854471

[51] Int. Cl.$^3$ ............................................... B32B 9/00
[52] U.S. Cl. ..................... 428/408; 428/484; 428/492; 428/500; 428/519; 428/521; 428/907; 524/571; 524/575; 264/236; 285/346; 239/DIG. 4; 277/DIG. 6
[58] Field of Search ................ 428/407, 408, 907, 65; 524/571, 575; 264/236

[56] References Cited

U.S. PATENT DOCUMENTS

| | | | |
|---|---|---|---|
| 1,998,099 | 4/1935 | Shankweiler | 428/484 |
| 2,070,918 | 2/1937 | Peterson | 428/484 |
| 2,541,689 | 2/1951 | Carson | 428/484 |
| 2,750,322 | 6/1956 | Cooke et al. | 428/65 X |
| 3,547,764 | 12/1970 | Amerongen | 428/492 |
| 3,620,901 | 11/1971 | Hartz et al. | 428/492 |
| 3,676,386 | 7/1972 | Brenner et al. | 260/27 |
| 3,872,036 | 3/1975 | Todani et al. | 260/424 |
| 3,874,905 | 4/1975 | Knights | 428/484 |
| 4,116,451 | 9/1978 | Nixon et al. | 277/DIG. 6 |
| 4,179,321 | 12/1979 | Verghese | 428/484 |

FOREIGN PATENT DOCUMENTS 815263  6/1959  United Kingdom ................ 428/492

OTHER PUBLICATIONS

Graphite Gaskets, Ref No. 54905V, Godycki et al., Chemical Abstracts 1971, vol. 74, No. 12.

*Primary Examiner*—P. C. Ives
*Attorney, Agent, or Firm*—Steele, Gould & Fried

[57] ABSTRACT

The invention relates to rubber articles, particularly spray forming means and spray jet forming means respectively, and their use in sanitary fittings. These are produced by vulcanization of a rubber mixture which contains besides caoutchouc and usual vulcanization additives and auxiliary agents graphite and preferably paraffin. With this mixture any lime deposits can easily detach themself or can even be completely prevented.

11 Claims, No Drawings

RUBBER ARTICLES, PARTICULARLY MOULDED RUBBER ARTICLES FOR USE IN SANITARY FITTINGS

This is a continuation of application Ser. No. 102,503, filed Dec. 11, 1979, now abandoned.

BACKGROUND OF THE INVENTION

The invention relates to rubber articles, particularly moulded rubber articles, for use in sanitary fittings.

In the case of sanitary fittings, rubber articles are frequently used as gaskets or connections. Of late, it has also become conventional practice to use rubber articles as nozzles for sprays and showers, particularly as spray disks. As in other parts of sanitary fittings, the problem of lime deposition occurs with rubber articles and particularly at those points where hot water is conveyed, where water drips or water is partly evaporated. Admittedly, the deposition of lime is less serious with rubber spray disks than with those made from metal or plastics, but even in the case of rubber articles the separation of lime is a problem which cannot be overlooked due to the long service life required of sanitary fittings.

In the case of rubber articles used in the sanitary field, it is known to provide them with a coating of polytetrafluoroethylene or to incorporate polytetrafluoroethylene into the rubber mixture. However, with rubber articles constructed in this way, the deposition of lime cannot be prevented. It has merely been found that lime deposits can be more easily removed from such rubber articles than is the case with conventional rubber.

BRIEF SUMMARY OF THE INVENTION

The object of the present invention is to provide rubber articles, particularly moulded rubber articles, in which the tendency to form lime deposits is greatly reduced and possibly even completely eliminated.

This object is achieved in that the rubber articles according to the invention are made from a mixture of 60 to 140 parts by weight of rubber and 140 to 60 parts by weight of graphite in conjunction with any known accelerating system for rubber. Paraffin may also be used as a component.

The use of graphite in rubber mixtures is known per se from other fields, where use is made of the capacity of graphite to provide mechanical lubrication. It has now surprisingly been found that a high graphite percentage in a rubber article is able to effectively prevent the deposition of lime thereon.

The prevention of lime deposition can be further improved by the rubber also containing paraffin. The paraffin quantity can vary within wide limits, depending on the intended use. Generally, 2 to 7 parts by weight and preferably 4 to 6 parts by weight of paraffin, based on 200 parts by weight of the rubber-graphite mixture are sufficient. The rubber-graphite mixture preferably contains 80 to 120 parts by weight of rubber and 120 to 200 parts by weight of graphite.

Advantageously, the paraffin is constituted by a paraffin mixture. The paraffin melting point is generally between approximately 40° and 70° C., preferably in the range approximately 55° to 60° C.

The way in which lime deposition is prevented in the case of the rubber articles according to the invention is not yet known. However, in connection with paraffin, it is assumed that when the paraffin is removed from the surface of the rubber articles by external influences, it is resupplied by exudation from within the rubber articles and is consequently always present in the necessary quantity on the rubber surface. Although polytetrafluoroethylene coatings should give rubber articles a much better separating action with respect to water and lime deposits, it has surprisingly been found that the rubber articles according to the invention are in this respect far superior to those with a polytetrafluoroethylene coating. Even after prolonged use in water with a high lime content, no disturbing lime deposits have been found, whereas in the case of conventional rubber articles, for example rubber spray disks, clogging phenomena due to the lime occur within the same amount of time.

Various different caoutchouc types can be used and preference is given to natural caoutchouc and in particular styrene-butadiene rubber. The rubber articles according to the invention preferably comprise a hot water-resistant rubber, because the lime deposition problem particularly occurs in pipes carrying hot water. With particular advantage, the rubber articles according to the invention are constructed as spray disks for a spray head and are preferably detachably connected to the latter, so that they can easily be replaced if revealing wear phenomena after prolonged use.

The invention also relates to the use of a rubber mixture formed from caoutchouc, a high graphite proportion and in particular paraffin for preventing the deposition of lime in water-carrying pipes.

The rubber can be produced in per se known manner using accelerating systems, vulcanization auxiliary agents, additives for increasing the ageing resistance and thermal stability, metal oxides, plasticizers and the like. The selection of the systems and/or additives is also dependent on the nature of the caoutchouc used and the desired characteristics.

DETAILED DESCRIPTION OF THE PREFERRED EMBODIMENT

Further features of the invention can be gathered from the following description of an embodiment in conjunction with the claims.

EXAMPLE 100 parts by weight of a styrene-butadiene rubber suitable for the production of hot water-resistant rubber are mixed with 100 parts of fine-particulate graphite and 5 parts by weight of a paraffin mixture with a melting point of approximately 55° to 60° C., 2 parts by weight of stearic acid, 3 parts by weight of emulsion plasticizer, 2.5 parts by weight of sulphur, 2 parts by weight of a sulphenamide accelerator, 1.1 parts by weight of a thiuran accelerator and 1 part by weight of zinc oxide and after moulding to give a rubber spray disk of a shower head vulcanization takes place to provide a hot water-resitant rubber article. The shape of the rubber spray disk and the way in which it is fixed to the shower head can be as described in West German Offenlegungsschrift (DE-OS) No. 2,613,618. It is particularly advantageous for the edges of the rubber spray disk, particularly on the individual spray grooves to be rounded, so that the very shaping contributes to the counteracting of lime deposition.

Long-term tests with showers operated with hot water having a very high lime content have shown that lime deposition and consequently a clogging of the grooves of the rubber spray disk can be effectively prevented.

However, there are also other uses for the rubber articles according to the invention. Thus, for example, when used as gaskets, particularly valve gaskets, it is once again possible to prevent undesired deposition of lime, so that the service life of the corresponding fittings is significantly increased.

However, preference is given to rubber parts in the form of spray forming means and spray jet forming means respectively, particularly those used on showers and sprinklers. These spray forming means and spray jet forming means respectively can be in the form of ring members, as described in DE-OS 2,613,618, or can be given some other shape, for example that of the spray disk member. The essential ingredients of the rubber mixture from which the rubber articles are produced by vulcanization are, in addition to the rubber, graphite and optionally paraffin, while the mixture may also contain conventional vulcanization auxiliary agents and other conventional additives.

What is claimed is:

1. Rubber articles, particularly shaped rubber articles through which water is sprayed and on which evaporation takes place, for use in sanitary fittings, comprising a mixture of
   a. 60 to 140 parts by weight of rubber,
   b. 140 to 60 parts by weight of graphite,
   c. 2 to 7 parts by weight of paraffin based on 200 parts by weight of rubber and graphite, and
   d. an accelerating system for rubber, whereby deposition of lime deposits on the articles is substantially prevented.

2. Rubber articles according to claim 1, comprising a mixture of 80 to 120 parts by weight of rubber and 120 to 80 parts by weight of graphite.

3. Rubber articles according to claims 1 or 2 comprising 4 to 6 parts be weight of paraffin.

4. Rubber articles according to claims 1 or 2 wherein the paraffin is a mixture of paraffins having a melting point of from about 40 to about 70° C.

5. Rubber articles according to claims 1 or 2, wherein the paraffin has a melting point of approximately 40° to 70° C.

6. Rubber articles according to claims 1 or 2, wherein the rubber is a styrene-butadiene rubber.

7. Rubber articles according to claims 1 or 2, wherein the rubber is a hot water resistant rubber.

8. Rubber articles according to claim 1, molded as rubber spray disks interchangeably insertable in a shower head.

9. Rubber articles according to claim 3, comprising 4 to 6 parts by weight of paraffin, based on 200 parts by weight of the rubber-graphite mixture.

10. Rubber articles according to claim 5, wherein the melting point of the paraffin is approximately 55° to 60° C.

11. A method for manufacturing rubber articles for spray discs and the like, which articles substantially prevent the deposition of lime deposits from water running therethrough and evaporating therefrom, comprising the steps of:
    forming the articles from a mixture of
    a. 60 to 140 parts by weight of rubber,
    b. 140 to 60 parts by weight of graphite,
    c. 2 to 7 parts by weight of paraffin based on 200 parts by weight of rubber and graphite, and
    d. an accelerating system for rubber and curing the mixture.

* * * * *